United States Patent
Lefebvre et al.

(10) Patent No.: US 6,368,656 B1
(45) Date of Patent: *Apr. 9, 2002

(54) PROCESS FOR THE PREPARATION OF FISH GELATIN

(75) Inventors: Gilbert Lefebvre, Saint Yrieix; Richard Biarrotte, Angouleme; Georges Takerkart, Issy les Moulineaux; Jacky David, Isle sur Sorgue, all of (FR)

(73) Assignee: SKW Biosystems, Boulogne Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,816

(22) Filed: Feb. 9, 1999

(30) Foreign Application Priority Data

Dec. 31, 1998 (FR) .............................................. 98 16720

(51) Int. Cl.$^7$ ................................................ A23L 1/324
(52) U.S. Cl. ......................... 426/643; 426/429; 426/437
(58) Field of Search ................................. 426/425, 429, 426/437, 643; 530/335; 424/576

(56) References Cited

U.S. PATENT DOCUMENTS

| | | | |
|---|---|---|---|
| 834,806 A | | 10/1906 | Hilbert |
| 2,024,683 A | * | 12/1935 | Epstein ........................... 99/11 |
| 2,908,615 A | | 10/1959 | Keil |
| 3,658,184 A | * | 4/1972 | Davis et al. ................. 210/504 |
| 4,043,996 A | * | 8/1977 | Donnelly et al. ............ 260/118 |
| 4,264,493 A | * | 4/1981 | Battista ....................... 260/117 |
| 4,759,933 A | * | 7/1988 | Uchida et al. .................. 426/7 |
| 5,093,474 A | * | 3/1992 | Grossman et al. ........... 530/355 |
| 5,210,182 A | * | 5/1993 | Nasrallah et al. ............ 530/355 |
| 5,484,888 A | | 1/1996 | Holzer ........................ 530/356 |
| 5,877,287 A | * | 3/1999 | Lilja et al. ................... 530/355 |

FOREIGN PATENT DOCUMENTS

| | | |
|---|---|---|
| EP | 0 436 266 A1 | 2/1990 |
| GB | 235 635 | 6/1925 |

OTHER PUBLICATIONS

Osborne, R., Utilisation of Lumpfish (*Cyclopterus lumpus*) Carcases for the Production of Gelatin, Advances in Fisheries Technology and Biotechnology for Increased Profitability. p. 143–150, 1990, abstract only.*

Kernot, J.C. and N. Speer., Production of Glue and Gelatin From Fish., Dept Science Ind Research., 2nd Dept. of Adhesives Research Comm. 1926, 22–23.*

Osborne et al., "Utilization of Lumpfish (*Cyclopterus lumpus*) Carcasses for the Production of Gelatin," Advances in Fisheries Technology and Biotechnology for Increased Profitability: Papers from the 34$^{th}$ Atlantic Fisheries Technological Conference and Seafood Biotechnological Workshop, St. John's, Canada, 1989, pp. 143–150.

Courts, "Structural Changes in Collagen," *Biochemistry Journal*, v. 81, pp. 356–365 (1961).

* cited by examiner

*Primary Examiner*—Arthur L. Corbin
(74) *Attorney, Agent, or Firm*—Nath & Associates PLLC; Gary M. Nath; Jerald L. Meyers

(57) ABSTRACT

The invention relates to a process for the preparation of fish gelatin from fresh or defrosted raw fish skins, which includes the steps of washing of the skins with an aqueous solution, of an oxidizing agent, treatment with acid and hot extraction at an acidic pH.

26 Claims, No Drawings

PROCESS FOR THE PREPARATION OF FISH GELATIN

BACKGROUND OF THE INVENTION

Gelatin is a protein of animal origin which has been known for a very long time and has numerous applications in the food, pharmaceutical, photographic and technical sectors.

It is widespread in animal tissues and organs, such as skin and bones, in the form of its natural precursor, collagen.

Gelatin is obtained industrially from the bones and skins of cattle and pigs, collected from abattoirs.

In both the United States and Europe, beef consumption has been decreasing for several years, gradually reducing the supply of bones and skins originating from this source. This phenomenon has been exacerbated in recent years by the bovine spongiform encephalopathy crisis and the resulting regulations.

As far as gelatins of porcine origin are concerned, their development is being restricted by the discovery of new outlets for the starting material—for example pork scratchings and aperitif snacks—and by religious considerations forbidding their use in certain countries.

It is therefore particularly important to look for other starting materials which can be used for the manufacture of gelatin.

It has been known for a long time that fish skin, scales and bones also contain collagen similar to that found in mammals.

Patent GB 235,635 relates to the manufacture of fish glues, gelatins and meals from by-products of marine origin. This principally involves treatment of these by-products with alkali, followed by treatment with sulfurous acid and washing with water to remove the volatile bases responsible for the fishy odor. However, there is no description of the by-products used, the extraction conditions or the characteristics of the gelatins obtained.

For several years, to respond to consumer demand for high-quality fresh products, especially fish fillets, the fishing and canning industry has developed the filleting of fish as soon as they were caught or on land after they had been defrosted. This results in the availability of a certain amount of fishing byproducts, particularly fish skins, which can potentially be processed to gelatin.

This has been done especially by NORLAND PRODUCTS, which, since 1985, has been producing aqueous solutions of fish gelatin by the acid extraction of cod skins. However, the corresponding gelatins do not qualify as gelling under the customary conditions for measurement of the gelling strength of gelatins (6.67% gelatin solution kept at 10° C. for 17 h according to Bloom's method described in <<The Science and Technology of Gelatin>>, 1977, A. G. WARD and A. COURTS Eds., Academic Press, p. 507) and remain liquid in solution even when the gelatin concentration is as high as 45%.

Other processes have been developed for improving the quality of the product obtained from fish skins. The process of patent EP 0436266 comprises a step involving treatment with dilute bases, followed by steps involving washing and treatments with different acids. In addition, the gelatin is extracted at neutral pH at a temperature preferably of between 40 and 50° C.

More recently, patent U.S. Pat. No. 5,484,888 reported a process for the preparation of gelatin from <<kosher>> fish skins, i.e. skins of fish with scales and fins.

The steps of the process described in said patent take place in a totally alkaline medium, the first step consisting in soaking the skins in an alkaline solution for 3 to 60 days. The extraction is also carried out at an alkaline pH, preferably equal to 10, and at a temperature of between 45 and 55° C. Finally, in said patent, tuna skins are considered to be unsuitable for the manufacture of gelatin because of the boiling pretreatment to which they are subjected.

SUMMARY OF THE INVENTION

The present invention therefore relates to an acid process for the preparation of high-quality gelling fish gelatin from fresh or defrosted raw fish skins, which comprises steps involving washing of the skins with water, treatment with acid and hot extraction at acid pH.

The starting material consists of fresh or defrosted fish skins obtained in large quantities when the fish is processed raw.

This is especially the case for <<tuna in brine>>, but also for other fish such as sole, tilapia and catfish, in particular the freshwater species *Ictalurus punctatus* commonly called <<channel catfish>>, whose raw fillets are marketed in large quantities.

According to one preferred feature, the fish skins originate from fish with scales and fins, for example tuna, tilapia, carp, Nile perch, salmon, sole, especially tropical sole, pollack, hake, mackerel or other similar fish.

According to another feature of the invention, the fish skins originate from fish without scales, for example catfish, in particular the freshwater species *Ictalurus punctatus* commonly called channel catfish, or else African sea catfish or North African catfish.

DETAILED DESCRIPTION

The fish fillets obtained after heading and evisceration are cut up and peeled by hand or machine to leave the fillets on one side and the skins on the other. At this stage, the skins are recovered and washed and can be frozen immediately for subsequent use.

The skins can be used as such or partially dried to a solids content of about 65% to 75%, either whole or in the form of pieces, said pieces having a size of about 10 to 30 cm for example, or else they can be ground to fragments with a size of between about 5 mm and 15 mm.

In the process of the present invention, the skins are first washed with water to remove the undesirable compounds, for example the blood and the fats.

Advantageously, it has been found that fresh skins or defrosted skins are easier to treat and yield gelatins with improved properties if the washing with water is carried out in a slightly oxidizing medium.

This in fact makes it possible to act on the very abundant microbial flora in the mucus of the skins. It thereby prevents, or at least slows down, the bacterial degradation phenomena which generate bad odors, without however degrading the starting material.

"Slightly oxidizing medium" is understood as meaning an aqueous solution of an oxidizing agent, the latter being present at a concentration of the order of 50 to 1000 ppm (0.005 to 0.1%).

The oxidizing agents which can be used are for example of the hypochlorite type, particularly sodium or potassium hypochlorite, or hydrogen peroxide.

After this washing, the skins are immersed in a cold acid bath, with agitation, in order to cause them to swell, assist the removal of undesirable compounds and prepare for extraction of the gelatin.

It has been found that a judicious combination of the reaction parameters, such as the nature of the acid, the amount of acid and the time, enables the gelatin to be extracted with a satisfactory yield and without mechanical degradation of the skins.

It will be preferable to use a mineral acid, for example hydrochloric acid, sulfuric acid or phosphoric acid, at a rate of 3 to 20 l per ton of fish skins, or an organic acid, for example acetic acid or lactic acid, in the above proportions.

The acid treatment will have a duration for example of the order of 1 to 8 h, preferably of about 4 h.

The acid bath must then be followed by washing with water to remove the excess acid and adjust the pH to a value below about 5.

It has also been found that, using this preparation, the skins can be extracted under thermal conditions not described hitherto, especially at a temperature above 50° C., for example of the order of 55° C. to 70° C., with no substantial loss of properties and notably with the retention a high gelling strength.

According to the invention, the extraction is carried out in an acid medium at a pH below 5, preferably of the order of 2.5 to 4.5.

The extraction is preferably stopped when the gelatin titer (i.e. the concentration of gelatin in the extraction broth) is of the order of 4 to 5%, for example after 4 to 6 h.

The medium is then separated by decantation to give a gelatin solution and a solid residue.

Advantageously, it has been found that it is possible to purify the solutions of fish gelatin, and in particular to remove the traces of compounds responsible for the fishy odor and taste, without subjecting the starting material to an alkaline ark treatment as described in the literature.

To do this, the gelatin solution, after extraction, is filtered in the presence of a filter aid such as diatomaceous earth, said filtration optionally being carried out on equipment of the plate filter type, making it possible to retain the traces of fats and obtain the desired clarity. The filtered solution is then passed over ion exchange resins to reduce the ionic charge and fix any fish degradation compounds such as amines and amine derivatives, after which the pH is adjusted to a value of the order of 5 to 7. Finally, the filtered gelatin solution is demineralized and concentrated under high vacuum to remove the volatile odors and further improve the odor of the product.

Interestingly, it has been found, finally, that the residue obtained after decantation of the extraction broth can also yield a small amount of non-gelling fish gelatin by the addition of water and heating at a temperature of about 95° C. for about 2 h.

The process according to the invention thus yields mainly a high-quality gelling fish gelatin without a fishy taste or odor. It is applicable to all fish skins and only their nature modifies the gelling strength obtained. It can also yield a small amount of non-gelling gelatin as a by-product.

The invention is illustrated by the Examples below without implying a limitation.

EXAMPLE 1

4.5 kg of frozen tuna skins are defrosted at room temperature. The skins obtained are then cut up to a size of the order of 20 to 40 cm. The cut skins are soaked for 20 minutes, with stirring, in a first washing bath containing 15 l of water rendered oxidizing by the addition of 14 ml of a sodium hypochlorite solution of density 1.2. After draining, a further 11.5 l of clean water are added and stirring is continued for 15 min; this second bath is then drained off.

An acid bath is then prepared by the addition of 6.7 l of water, followed by 46 ml of concentrated sulfuric acid (96%). The duration of this bath is of the order of 5 h, with intermittent agitation. When this bath has ended, the acid solution is drained off and the skins are then washed with 3×15 l of water, each wash lasting about 1 h.

The skins prepared in this way are placed in a reactor, into which 15 l of hot water at 90° C. are introduced. The solution in the reactor has a pH of between 3.5 and 4.0 and is kept at 58–60° C. by circulation through an external heat exchanger. After 4 h of extraction, the gelatin titer is of the order of 4%. The extraction broth is then drained off and contains the equivalent of 640 g of gelatin.

The resulting broth is centrifuged and then filtered with the aid of a diatomaceous earth on an apparatus of the AMAFILTER type.

The clear solution of fish gelatin is then demineralized by passage over ion exchange resins and the pH of the solution obtained is adjusted to between 5 and 7.

This solution is evaporated under vacuum to a concentration of between 25 and 30%. The concentrated solution is then gelled and dried in the customary manner.

This gives 605 g of dry fish gelatin with a gelling strength of 198 blooms and a viscosity of 3.8 mPa.s.

EXAMPLE 2

2 kg of tilapia skins are defrosted as in Example 1 and then washed twice with water before being treated for 4 h with a sulfuric acid bath of 3 l of water containing 8.5 ml of sulfuric acid per kg of fish skins. The skins prepared in this way are washed with water and then extracted as in Example 1 to give 214 g of fish gelatin with a gelling strength of 264 blooms and a viscosity of 2.1 mPa.s.

EXAMPLE 3

3 kg of skins of catfish (the species Ictalurus punctatus) or<< channel catfish>> are defrosted and prepared as in Example 1 to give 337 g of fish gelatin with a gelling strength of 217 blooms and a viscosity of 1.7 mPa.s.

EXAMPLE 4

3 kg of mackerel skins are defrosted and treated as in Example 1 to give 190 g of fish gelatin with a gelling strength of 130 blooms and a viscosity of 3.5 mPa.s.

EXAMPLE 5

2.6 kg of frozen tuna skins are defrosted at room temperature. The skins obtained are then cut up to pieces having a size of the order of 20 to 40 cm. The cut skins are soaked for 20 minutes, with stirring, in a first washing bath containing 9 l of water rendered oxidizing by the addition of 8.5 ml of a sodium hypochlorite solution of density 1.2. After draining, a further 7 l of clean water are added to make up a second bath, which is stirred for 15 minutes.

After draining, an acid bath is then prepared by the addition of 6 l of water, followed by 28 ml of glacial acetic acid. The duration of this bath is of the order of 5 h, with intermittent stirring. When this bath has ended, the acid solution is drained off and the skins are then washed for 1 h with 9 l of water.

After draining, the skins are placed in a reactor, into which 8 l of hot water at 90° C. are introduced. The solution in the reactor has a pH of between 4.5 and 5 and is kept at 55° C. for 4 h by circulation through an external heat exchanger. After 4 h, the gelatin titer is of the order of 3.8%.

The broth is then drained off and the centrifugation, filtration, demineralization, evaporation, gelling and drying operations described in Example 1 are carried out.

This gives 323 g of dry fish gelatin with a gelling strength of 266 blooms and a viscosity of 3.9 mPa.s.

EXAMPLE 6

The procedure is as in Example 5 except that lactic acid is used instead of acetic acid for the acid bath. This gives 294 g of gelatin with a gelling strength of 260 blooms and a viscosity of 3.8 mPa.s.

What is claimed is:

1. Process for the preparation of fish gelatin from fresh or defrosted raw fish skins, consisting essentially of:
   a) washing the fresh or defrosted raw fish skins, either whole, in the form of pieces, or in the form of ground fragments, with an aqueous solution of an oxidizing agent present in a concentration of 50 to 1000 ppm (0.005 to 0.1%) in order to prevent bacterial degradation of the fish skins;
   b) treating the washed skins with an acid; and then
   c) carrying out extraction of gelatin from the fish skins at a temperature above 50° C. and at an acidic pH;
   wherein said process does not include a step of alkaline treatment.

2. Process according to claim 1 wherein the fish skins are partially dried.

3. Process according to claim 1 wherein the oxidizing agent is selected from the group consisting of hypochlorites and hydrogen peroxide.

4. Process according to claim 1, wherein a mineral acid or an organic acid is used for the acid treatment.

5. Process according to claim 4 wherein hydrochloric acid, sulfuric acid or phosphoric acid is used as the mineral acid, or acetic acid or lactic acid is used as the organic acid.

6. Process according to claim 5 wherein said acid is used at a rate of 3 to 20 l/ton of fish skins.

7. Process according to claim 4 wherein said acid is used at a rate of 3 to 20 l/ton of fish skins.

8. Process according to claim 7 wherein the acid treatment is carried out for 4 hours.

9. Process according to claim 1 wherein the acid treatment is carried out for 1 to 8 hours.

10. Process according to claim 9 wherein the extraction is carried out at a pH between 2.5 and 4.5.

11. Process according to claim 1 wherein the extraction is carried out at a pH below 5.

12. Process according to claim 11 wherein the extraction is carried out at 55° C. to 70° C.

13. Process according to claim 1 wherein the extraction is carried out at a temperature above 50° C.

14. Process according to claim 1 which also comprises steps involving purification and demineralization of the gelatin resulting from extraction.

15. Process according to claim 14 wherein the gelatin resulting from extraction is treated with diatomaceous earth and then filtered.

16. Process according to claim 15 wherein the filtered gelatin is subjected to demineralization on ion exchange resins, followed by adjustment to a pH of the order of 5 to 7.

17. Process according to claim 15 wherein the filtered and demineralized gelatin is subsequently concentrate under vacuum to remove the volatile odors and is then solidified and dried.

18. Process according to claim 1 wherein the fish skins are raw skins originating from fresh fish, which are washed and immediately frozen after peeling.

19. Process according to claim 18 wherein the skins originate from fish with scales and fins.

20. Process according to claim 19 wherein said fish is selected from the croup consisting of tuna, tilapia, Nile perch, salmon, sole, carp, pollack, hake and mackerel.

21. Process according to claim 19 wherein said fish is tropical sole.

22. Process according to claim 18 wherein the skins originate from fish without scales.

23. Process according to claim 22 wherein said fish is selected from the group consisting of channel catfish, African sea catfish and North African catfish.

24. Process according to claim 22 wherein said fish is catfish.

25. Process according to claim 1 wherein the oxidizing agent is sodium hypochlorite.

26. Process according to claim 1 wherein the oxidizing agent is potassium hypochlorite.

* * * * *